United States Patent
Seymour-Loya et al.

(10) Patent No.: US 11,274,242 B2
(45) Date of Patent: Mar. 15, 2022

(54) FRICTION REDUCER FOR HYDRAULIC FRACTURING

(71) Applicant: STEPAN COMPANY, Northfield, IL (US)

(72) Inventors: Brian Seymour-Loya, Houston, TX (US); Aaron Sanders, Houston, TX (US); Dawn Friesen, Houston, TX (US); Gregory P. Dado, Chicago, IL (US)

(73) Assignee: STEPAN COMPANY, Northfield, IL (US)

( * ) Notice: Subject to any disclaimer, the term of this patent is extended or adjusted under 35 U.S.C. 154(b) by 0 days.

(21) Appl. No.: 16/798,964

(22) Filed: Feb. 24, 2020

(65) Prior Publication Data

US 2020/0190397 A1 Jun. 18, 2020

Related U.S. Application Data

(63) Continuation of application No. PCT/US2018/048160, filed on Aug. 27, 2018.
(Continued)

(51) Int. Cl.
*C09K 8/68* (2006.01)
*C10M 157/04* (2006.01)
(Continued)

(52) U.S. Cl.
CPC .............. *C09K 8/68* (2013.01); *C10M 157/04* (2013.01); *C09K 2208/28* (2013.01);
(Continued)

(58) Field of Classification Search
None
See application file for complete search history.

(56) References Cited

U.S. PATENT DOCUMENTS 4,525,496 A * 6/1985 Adaway ................. C09K 8/584
523/337
4,904,695 A * 2/1990 Bell ....................... A01N 25/04
514/521
(Continued)

FOREIGN PATENT DOCUMENTS

CN 105238381 A 1/2016
EP 0160182 A2 11/1985
(Continued)

OTHER PUBLICATIONS

L. Xu et al., SPE-184508-MS, "Case Study: A Two-Part Salt-Tolerant Friction Reducer System Enables the Reuse of Produced Water in Hydraulic Fracturing," presented at the SPE International Conference on Oilfield Chemistry, Montgomery, TX, Apr. 3-5, 2017, 1 page abstract.
(Continued)

*Primary Examiner* — Jeffrey D Washville
(74) *Attorney, Agent, or Firm* — Dilworth IP, LLC

(57) ABSTRACT

Compositions comprising an acrylamide polymer emulsion and a nonionic surfactant suitable for use as friction reducers for hydraulic fracturing are disclosed. The nonionic surfactants include aralkylated phenol ethoxylates, amine ethoxylates, amidoamine ethoxylates, linear or branched alcohol EO/PO alkoxylates, ethoxylated alcohols, alkylphenol ethoxylates, and EO-capped poly(oxypropylene) block copolymers. Improved hydraulic fracturing processes in which an acrylamide polymer emulsion is used as a friction reducer are also described. In these processes, the surfactant is included in the composition with the acrylamide polymer friction reducer, or it is introduced separately into the process. The performance of low-cost polyacrylamide friction reducers can be boosted with a small proportion of certain readily available nonionic surfactants. The inventive compositions are effective in high-salinity environments,
(Continued)

and their performance can sometimes exceed that of more-expensive salt-tolerant friction reducers, thereby reducing fresh water demand and enabling greater utilization of produced water.

24 Claims, 5 Drawing Sheets

Related U.S. Application Data

(60) Provisional application No. 62/551,001, filed on Aug. 28, 2017.

(51) Int. Cl.
    *C10N 50/00*     (2006.01)
    *C10N 30/06*     (2006.01)
    *C10N 40/08*     (2006.01)

(52) U.S. Cl.
    CPC . *C10M 2209/107* (2013.01); *C10M 2217/024* (2013.01); *C10M 2217/046* (2013.01); *C10N 2030/06* (2013.01); *C10N 2040/08* (2013.01); *C10N 2050/01* (2020.05)

(56) References Cited

U.S. PATENT DOCUMENTS

| | | |
|---|---|---|
| 5,067,508 A | 11/1991 | Lee et al. |
| 5,925,714 A | 7/1999 | Larson et al. |
| 6,776,235 B1 | 8/2004 | England |
| 7,579,302 B2 | 8/2009 | McMechan et al. |
| 7,621,335 B2 | 11/2009 | Valeriano et al. |
| 9,315,722 B1 | 4/2016 | Jackson et al. |
| 9,365,764 B2 | 6/2016 | Bobier et al. |
| 9,670,398 B2 | 6/2017 | Wang et al. |
| 9,708,562 B2 | 7/2017 | Soane et al. |
| 2015/0329763 A1* | 11/2015 | Kumar ............. C09K 8/36 507/120 |
| 2016/0251567 A1 | 9/2016 | Lin et al. |
| 2017/0096597 A1* | 4/2017 | Hu ............. C09K 8/82 |
| 2017/0362489 A1* | 12/2017 | Jackson ............. C09K 8/584 |

FOREIGN PATENT DOCUMENTS

| | | |
|---|---|---|
| WO | 2015175627 A1 | 11/2015 |
| WO | 2017100329 A1 | 6/2017 |

OTHER PUBLICATIONS

International Search Report and Written Opinion; Application No. PCT/US2018/048160; dated Nov. 20, 2018; 15 pages.

\* cited by examiner

FRICTION REDUCER FOR HYDRAULIC FRACTURING

FIELD OF THE INVENTION

The invention relates to hydraulic fracturing and more particularly to a way to boost the performance of friction reducers used in hydraulic fracturing.

BACKGROUND OF THE INVENTION

Hydraulic fracturing is used to stimulate the production of oil and gas from a portion of a subterranean formation or reservoir. Fresh water, "produced" water from a formation, or some combination thereof is injected into the formation at high flow rates to create or enhance fractures in the formation. "Proppants" such as silicas are included to keep fractures open enough to allow oil, gas, and produced water to be recovered.

Injecting water at high rates creates friction. To reduce the energy and horsepower requirements for hydraulic fracturing by as much as 80%, friction reducers are added to the injected water, and such processes are known as "slickwater fracturing." Acrylamide polymers such as partially hydrolyzed polyacrylamide ("HPAM") are well known friction reducers for slickwater fracturing.

High concentrations of monovalent and divalent cations in the untreated or produced water commonly used for hydraulic fracturing adversely affect the performance of traditional friction reducers. A variety of acrylamide-based polymer products that incorporate anionic or cationic monomers have been developed to cover a range of fluid conditions, particularly "total dissolved solids" (TDS) content. Generally, these alternatives to HPAM add cost.

To overcome the problem of reduced effectiveness of friction reducers with produced water, salt-tolerant friction reducer systems have been developed. See, e.g., L. Xu et al., SPE-184508-MS, "Case Study: A Two-Part Salt-Tolerant Friction Reducer System Enables the Reuse of Produced Water in Hydraulic Fracturing," presented at the SPE International Conference on Oilfield Chemistry, Montgomery, Tex., 3-5 Apr. 2017. As the paper explains, it is desirable to identify new friction reducers that can handle produced water with up to 300,000 ppm of TDS. The solution proposed in the paper uses a water-in-oil cationic polymer and surfactant inverter. Unfortunately, as indicated above, the salt-tolerant friction reducers developed to address high salinity conditions are more expensive than traditional friction reducers.

Friction reducers are introduced either as aqueous solutions or, more often, as water-in-oil emulsions (see, e.g., U.S. Pat. Nos. 5,067,508 and 9,708,562). The emulsions consist of polymer molecules partially solubilized in water droplets that form the discontinuous phase of the emulsion. The water droplets are emulsified in a continuous hydrocarbon phase. In some cases, the emulsions are "dewatered," leaving behind mostly the acrylamide polymer and hydrocarbon base. Combining the emulsion with a large proportion of water inverts the emulsion and releases the water-soluble, friction-reducing acrylamide polymer. An "inverting surfactant" is often included in water-in-oil emulsions used in oilfield and other applications. U.S. Pat. No. 5,925,714, for instance, describes alkoxylated castor oils, tridecyl alcohol ethoxylates, and nonylphenol ethoxylates as inverting surfactants for the polyacrylamide water-in-oil emulsions used for flocculation in a wastewater treatment process.

In other approaches to enhancing friction reduction, introduction of certain anionic or cationic surfactants has been suggested (see, e.g., U.S. Publ. No. 2017/0096597, which provides results with sodium decyl sulfate or cetyltrimethylammonium bromide in combination with partially hydrolyzed polyacrylamide or other acrylamide polymers). In another approach (U.S. Pat. No. 9,365,764), a slickwater fracturing fluid comprises base water with up to 300,000 ppm TDS, a viscosifier, a scale inhibitor, and a surfactant composition that includes a dibasic ester, a nonionic surfactant, and a terpene. In yet another approach to making improved friction reducers, the water-in-oil emulsion used as a friction reducer is prepared in the presence of an ammonium salt to incorporate at least about 3 wt. % of the salt in the emulsion (U.S. Pat. No. 9,315,722); this technique would not necessarily be useful with commercially available friction reducers.

The industry would benefit from the availability of improved, economical ways to enhance the effectiveness of friction reducers for hydraulic fracturing processes. A preferred approach would use a small proportion of easily synthesized or commercially available materials. Ideally, the friction reducers would perform well in high-salinity environments in which the performance of conventional acrylamide polymers is known to suffer.

SUMMARY OF THE INVENTION

In one aspect, the invention relates to a composition suitable for use as a friction reducer for hydraulic fracturing. The composition comprises an acrylamide polymer emulsion and a nonionic surfactant.

In some aspects, the nonionic surfactant is selected from (i) aralkylated phenol ethoxylates; (ii) $C_{12}$-$C_{22}$ amine ethoxylates or $C_{12}$-$C_{22}$ amidoamine ethoxylates; (iii) alkoxylates of linear or branched $C_8$-$C_{18}$ alcohols, the alkoxylates having 10 to 90 mole % of oxyethylene units and 10 to 90 mole % of oxypropylene units, wherein the mole % values are based on the combined amounts of oxyethylene and oxypropylene units; (iv) ethoxylated $C_{12}$-$C_{15}$ alcohols having a calculated HLB value within the range of 13 to 16; (v) alkylphenol ethoxylates having a $C_8$-$C_{16}$ alkyl group and an average of 8 to 25 oxyethylene units; and (vi) ethylene oxide-capped poly(oxypropylene) block copolymers having a calculated HLB value within the range of 13 to 16.

In other aspects, the surfactant has a calculated HLB value within the range of 11 to 17 and is selected from aralkylated phenol ethoxylates, $C_{12}$-$C_{22}$ amine ethoxylates, $C_{12}$-$C_{22}$ amidoamine ethoxylates, and alkylphenol ethoxylates having a $C_8$-$C_{16}$ alkyl group and an average of 8 to 25 oxyethylene units.

In another aspect, the invention relates to an inverted aqueous mixture. This mixture comprises an aqueous brine having a total dissolved solids content of at least 10,000 ppm and from 0.001 to 1 wt. %, based on the amount of inverted aqueous mixture, of an inventive friction reducer composition as described above.

In other aspects, the invention relates to hydraulic fracturing processes for recovering oil in which an acrylamide polymer emulsion is used as a friction reducer. In one such process, the improvement comprises using as a friction reducer a composition comprising the acrylamide polymer emulsion and an effective amount of the nonionic surfactant described above. In another such process, the improvement comprises including in the process an effective amount of the nonionic surfactant described above.

We surprisingly found that the performance of low-cost polyacrylamide friction reducers can be boosted with a small proportion of certain readily available nonionic surfactants. Additionally, the inventive compositions promote rapid inversion of acrylamide polymer emulsions in aqueous base fluids. The inventive compositions are effective even in high-salinity environments, and their performance can sometimes exceed that of more-expensive, salt-tolerant friction reducers. This allows operators to reduce fresh water demand by using more produced water. It also reduces costs by using conventional acrylamide polymers such as HPAM. Alternatively, operators can choose to further amplify the performance benefits of salt-tolerant friction reducers.

DETAILED DESCRIPTION OF THE INVENTION

Figure 1:
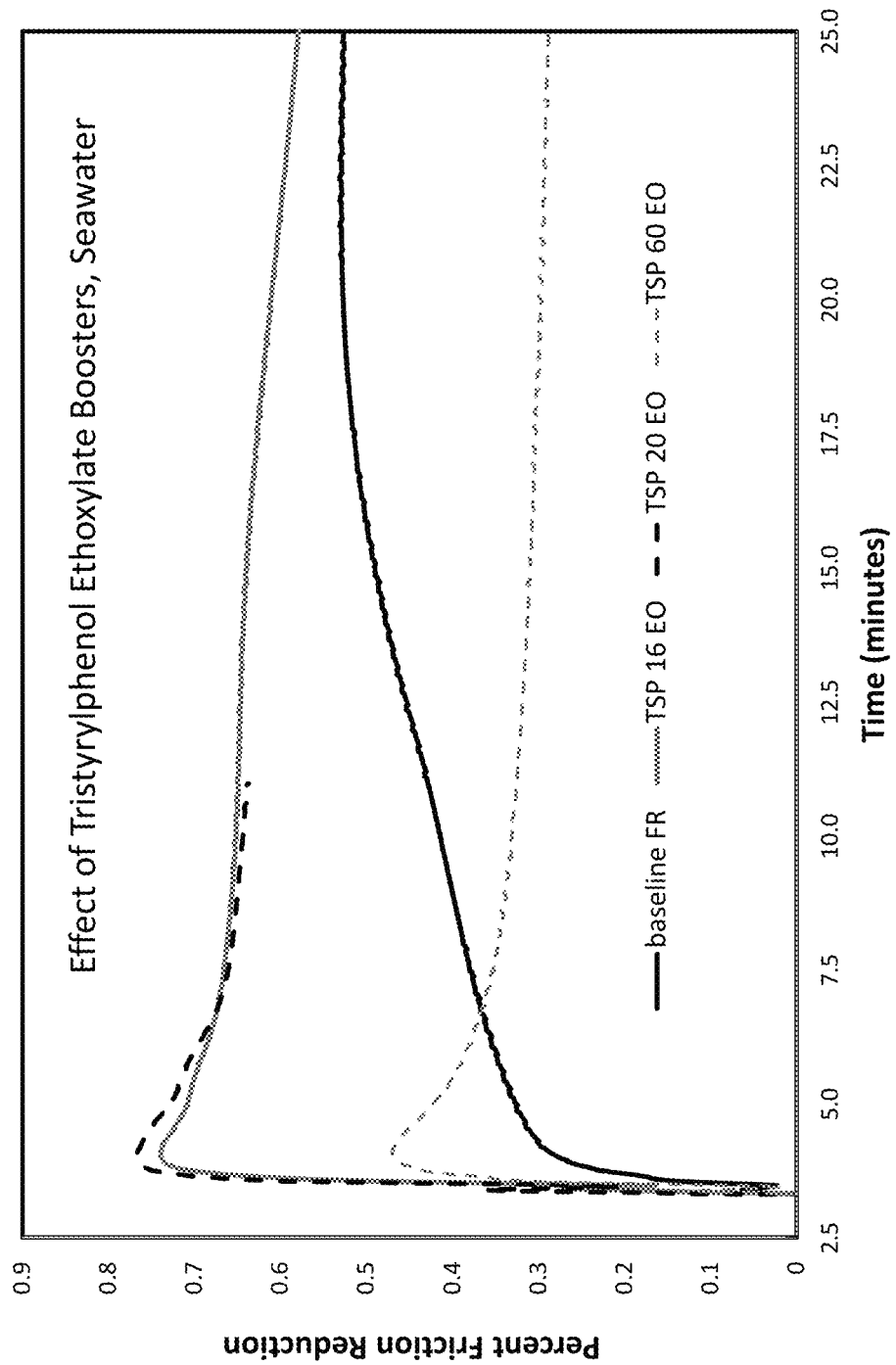
FIG. 1 shows the effect of using a series of tristyrylphenol ethoxylate compositions to boost the performance of a partially hydrolyzed polyacrylamide friction reducer in a seawater base compared with baseline performance with no booster added.

A small proportion of certain nonionic surfactants can improve the performance of acrylamide polymer emulsions in reducing fluid friction in hydraulic fracturing applications. Performance is especially noteworthy when high concentrations of monovalent or divalent cations are present in the aqueous base fluid.

In one aspect, the invention relates to a composition suitable for use as a friction reducer for hydraulic fracturing. The composition comprises an acrylamide polymer emulsion and a nonionic surfactant.

Acrylamide Polymer Emulsion

Acrylamide polymers suitable for use are in the form of an emulsion, usually a water-in-oil emulsion, i.e., one having a continuous hydrocarbon phase and a discontinuous aqueous phase. The aqueous phase comprises an acrylamide polymer, preferably an anionic acrylamide polymer. A water-in-oil emulsion can be a desirable way to introduce a friction reducer into a hydraulic fracturing process. The active components are maintained in tiny emulsified droplets until the emulsion is contacted with a relatively large volume of water. The emulsion then inverts and releases the water-soluble acrylamide polymer into the base water or brine. The oil phase of the water-in-oil emulsion is desirably a liquid hydrocarbon, typically xylene, toluene, mineral oils, kerosenes, naphthas, or the like. The products are supplied for use as friction reducers in oilfield applications. Suitable acrylamide polymers are available from SNF Floerger, Schlumberger, BASF, Haliburton, Rockwater Energy Solutions, and other suppliers. Examples include FLOPAM™ EMF-533 and PFR-902 anionic high viscosity acrylamide emulsions and FR-3000 ad FR-5000 anionic acrylamide emulsions, products of products of SNF Floerger.

The acrylamide polymers present in these emulsions comprise recurring units of acrylamide and may include recurring units of other ethylenic monomers such as (meth) acrylic acid, (meth)acrylate esters, vinyl esters, vinyl sulfonic acids, and the like. Partially hydrolyzed polyacrylamides are readily available and are preferred because of their relatively low cost. Salt-tolerant acrylamide polymers can also be used, but they are typically more expensive.

Acrylamide polymers are generally made by polymerizing acrylamide with or without suitable comonomers, typically in the presence of a free-radical initiator, to prepare essentially linear acrylamide polymers. Acrylamide polymers are usually water soluble. Polyacrylamides can often be used as obtained after polymerization. Preferably, however, the polyacrylamide is partially hydrolyzed by reacting it with a base, such as sodium hydroxide, to convert a portion of the amide groups to carboxylic acid groups. Hydrolysis of an acrylamide recurring unit essentially generates an acrylic acid recurring unit. Partially hydrolyzed polyacrylamide is often referred to as "HPAM." The carboxylate groups present in HPAM make this kind of acrylamide polymer emulsion anionic in nature, and anionic acrylamide polymer emulsions are generally preferred.

The acrylamide polymers usually have relatively high molecular weights. For instance, in some aspects, the acrylamide polymer will have a weight-average molecular weight, as determined by an intrinsic viscosity measurement, within the range of 1,000,000 to 30,000,000 g/mol, from 1,000,000 to 10,000,000 g/mol, or from 1,000,000 to 5,000,000 g/mol.

Other suitable acrylamide polymer emulsions have been described elsewhere. See, e.g., U.S. Publ. No. 2017/0096597 at paragraphs [0069]-[0107], and U.S. Pat. No. 9,315,722 ("Friction Reducing Polymers," cols. 3-4), the teachings of which are incorporated herein by reference.

In some aspects, the nonionic surfactants described below are incorporated into the emulsion containing the acrylamide polymer. We found that these surfactants can often be incorporated into the emulsions without destabilizing them. The aqueous phase of the acrylamide polymer emulsions usually makes up 30 to 95 wt. % of the emulsion, although the proportion of water will be much lower in a "dewatered" emulsion. The aqueous phase includes water and the acrylamide polymer and may include some or all of the nonionic surfactant. The acrylamide polymer typically makes up 10 to 50 wt. % or 25 to 40 wt. % of the emulsion (or higher proportions in dewatered emulsions). The oil phase is typically 5 to 70 wt. % or 20 to 35 wt. % of the emulsion (or higher proportions in dewatered emulsions). In some aspects, the nonionic surfactant is included at 0.1 to 10 wt. %, 0.5 to 5 wt. %, or 1 to 4 wt. % based on the amount of acrylamide polymer emulsion.

The acrylamide polymer emulsion may include small proportions of other components, including, for instance, one or more emulsifiers, inverting surfactants, salts, inhibitors, and the like, as is discussed in U.S. Pat. Nos. 5,067,508; 9,315,722; and 9,708,562, the teachings of which are incorporated herein by reference. Suitable emulsifiers are well known. Examples include sorbitan esters (sorbitan monostearate, sorbitan monooleate, and the like), alcohol ethoxylates, fatty acid alkanolamides, and the like.

The amount of acrylamide polymer emulsion used is generally within the range of 0.01 to 10 gallons per thousand gallons (gpt), preferably from 0.2 to 5 gpt or from 0.25 to 2.5 gpt, based on the amount of base water used in the hydraulic fracturing process.

Nonionic Surfactant

Nonionic surfactants suitable for use include (i) aralkylated phenol ethoxylates; (ii) $C_{12}$-$C_{22}$ amine ethoxylates or $C_{12}$-$C_{22}$ amidoamine ethoxylates; (iii) alkoxylates of linear or branched $C_8$-$C_{18}$ alcohols, the alkoxylates having 10 to 90 mole % of oxyethylene units and 10 to 90 mole % of oxypropylene units, wherein the mole % values are based on the combined amounts of oxyethylene and oxypropylene units; (iv) ethoxylated $C_{12}$-$C_{15}$ alcohols having a calculated HLB value within the range of 13 to 16; (v) alkylphenol ethoxylates having a $C_8$-$C_{16}$ alkyl group and an average of 8 to 25 oxyethylene units; and (vi) ethylene oxide-capped poly(oxypropylene) block copolymers having a calculated HLB value within the range of 13 to 16.

The nonionic surfactant is generally used in an amount within the range of 0.005 to 0.5 gallons per thousand gallons (5 to 500 ppm), preferably from 0.01 to 0.2 gpt (10 to 200 ppm) or from 0.02 to 0.1 gpt (20 to 100 ppm), based on the amount of base water used in the hydraulic fracturing process. For example, the 0.08 gpt level is described as "80 ppm" in the examples provided below.

1. Aralkylated Phenol Ethoxylates

In some aspects, the nonionic surfactant is an aralkylated phenol ethoxylate. Suitable aralkylated phenol ethoxylates can be made by aralkylating a phenol with a vinyl aromatic monomer, preferably styrene, followed by ethoxylation of the phenolic hydroxyl group with a desired number of ethylene oxide equivalents. The aralkylated phenols have one, two, or three aralkyl groups. Thus, mono-, di-, and tristyrylphenols are suitable for use, as are mixtures of these. Many aralkylated phenols are supplied as mixtures of two or more different aralkylated phenols. For instance, tristyrylphenol as supplied typically contains a significant proportion of distyrylphenol. Tristyrylphenol ethoxylates, especially those having an average of 12 to 50 EO recurring units, or from 16 to 40 EO recurring units, are preferred. Suitable aralkylated phenol ethoxylates are available commercially from Stepan Company under the MAKON® mark, or from other suppliers. Examples include MAKON® TSP-16, MAKON® TSP-20, MAKON® TSP-25, and MAKON® TSP-40, which have an average of 16, 20, 25, or 40 oxyethylene units, respectively. See, e.g., Table 1, Examples 3 and 4; Table 2, Examples 12-14; and Table 3, Examples 20 and 21.

In some aspects, the aralkylated phenol ethoxylates have a calculated HLB value within the range of 11 to 17, preferably from 11 to 14. This is discussed further below.

2. Amine Ethoxylates and Amidoamine Ethoxylates

Suitable nonionic surfactants include $C_{12}$-$C_{22}$ amine ethoxylates or $C_{12}$-$C_{22}$ amidoamine ethoxylates. These surfactants ultimately derive from $C_{16}$-$C_{22}$ fatty acids, which can be saturated (e.g., coco fatty acid, palmitic acid, stearic acid), monounsaturated (e.g., oleic acid), or polyunsaturated (e.g., linoleic acid, linolenic acid). The amine ethoxylates or amidoamine ethoxylates can have any desired degree of ethoxylation, although 6 to 40 oxyethylene (EO) units, or 8 to 20 EO units, or 8 to 14 EO units, are preferred.

A preferred class of amine ethoxylates are tallowamine ethoxylates. Tallowamine ethoxylates are generally produced in multiple steps from tallow (animal fat). In a first step, the animal fat is hydrolyzed to produce a mixture of fatty acids, primarily oleic acid ($C_{18}$, monounsaturated), palmitic acid ($C_{18}$, saturated), and stearic acid ($C_{18}$, saturated). The fatty acid mixture is reacted with ammonia at high temperature in the presence of a metal oxide catalyst to give a mixture of fatty nitriles. Hydrogenation of this mixture provides a corresponding mixture of fatty amines. The fatty amines are then reacted with a desired number of ethylene oxide equivalents to give tallowamine ethoxylates. In one aspect, the tallowamine ethoxylate has an average of 8 to 20 EO recurring units. For examples, see Table 1, Examples 1, 2, and 5; and Table 3, Examples 16-19.

Commercially available amine ethoxylates include cocamine ethoxylates and tallowamine ethoxylates available from Stepan under the TOXIMUL® mark, including TOXIMUL® TA-5, TOXIMUL® CA-7.5, TOXIMUL® TA-8, TOXIMUL® TA-10, TOXIMUL® TA-15, and TOXIMUL® TA-20, which have an average of 5, 7.5, 8, 10, 15, or 20 oxyethylene units, respectively.

Amidoamine ethoxylates are usually produced in two steps starting with a reaction of the corresponding fatty acid or fatty ester with a polyamine such as diethylenetriamine ("DETA") or an aminoalcohol such as 2-aminoethyl ethanolamine ("AEEA") to produce an "amidoamine," i.e., an amide having amine functionality. When DETA is used, for example, the resulting amide will have both primary and secondary amine groups (in addition to the amide functionality). When AEEA is used, the resulting amide will have hydroxyl and secondary amine groups. In the second reaction step, active hydrogen groups (amino groups or both amino and hydroxyl groups) of the amidoamine react with ethylene oxide to give the amidoamine ethoxylate.

Thus, suitable amidoamine ethoxylates can be produced by reacting commercially available methyl esters or methyl ester mixtures with AEEA or DETA followed by an ethoxylation step, preferably with 6 to 40, 8 to 20, or 8 to 14 EO equivalents. Suitable methyl ester starting materials for making the amidoamines include $C_8$-$C_{18}$ methyl ester mixtures, for instance, STEPAN® C-25, STEPAN® C-42, STEPAN® C-48, and STEPAN® C-65 from Stepan Company. For examples, see Table 3, Examples 29 and 31-34.

In some aspects, the $C_{12}$-$C_{22}$ amine ethoxylates or $C_{12}$-$C_{22}$ amidoamine ethoxylates have a calculated HLB value within the range of 11 to 17, preferably from 11 to 14. This is discussed further below.

3. Alkoxylates of Linear or Branched $C_8$-$C_{18}$ Alcohols

Suitable nonionic surfactants include alkoxylates of linear or branched $C_8$-$C_{18}$ alcohols. In particular, these alkoxylates have 10 to 90 mole % of oxyethylene (EO) units and 10 to 90 mole % of oxypropylene (PO) units. The mole % values are based on the combined amounts of oxyethylene and oxypropylene units. The EO and PO units can be introduced in blocks or randomly.

These alkoxylates are conveniently made by reacting a $C_8$-$C_{18}$ linear or branched alcohol with EO, PO, or a combination thereof in the presence of a catalyst, commonly a base catalyst such as potassium hydroxide. In a preferred approach, ethylene oxide units are introduced first, followed by propylene oxide units, to give a block copolymer having secondary hydroxyl groups.

In preferred aspects, the alkoxylates have 20 to 80 mole %, or 30 to 70 mole %, of oxyethylene units and 20 to 80 mole %, or 30 to 70 mole %, of oxypropylene units. In a preferred aspect, the alkoxylates have an internal EO block and an external PO block as illustrated in the surfactants used in Table 4, Examples 35-43. In yet other aspects, the alkoxylates are produced from linear or branched $C_{12}$-$C_{14}$ alcohols.

4. Ethoxylated Alcohols

Suitable ethoxylated alcohols are ethoxylated $C_{12}$-$C_{15}$ alcohols having a calculated HLB value within the range of 13 to 16. The alcohols can be linear or branched, primary or secondary.

Suitable ethoxylated alcohols can be made by reacting a $C_{12}$-$C_{15}$ alcohol, or in some aspects, a $C_{12}$-$C_{14}$ alcohol, a $C_{12}$-$C_{13}$ alcohol, or a $C_{13}$ alcohol with 9 to 20 molar equivalents, or 9 to 15 molar equivalents, of ethylene oxide in the presence of a catalyst, typically a base catalyst.

Suitable products are commercially available and include, e.g., MAKON® TD-18 (tridecyl alcohol 18 EO ethoxylate, HLB=16), MAKON® TD-12, (tridecyl alcohol 12 EO ethoxylate, HLB=14), BIO-SOFT® N25-9 ($C_{12}$-$C_{15}$ alcohol 9 EO ethoxylate, HLB=13.3), BIO-SOFT® N25-12 ($C_{12}$-$C_{15}$ alcohol 12 EO ethoxylate, HLB=14.4), BIO-SOFT® E-678 ($C_{12}$-$C_{15}$ alcohol 9 EO ethoxylate, HLB=13.3), and BIO-SOFT® EC-639 ($C_{12}$-$C_{14}$ alcohol 8 EO ethoxylate, HLB=13.3), products of Stepan Company. Suitable ethoxylated $C_{12}$-$C_{15}$ alcohols include certain TERGITOL™ products from Dow Chemical, including TERGITOL™ 15-S-9 ($C_{15}$ alcohol 9 EO ethoxylate, HLB=13.3), TERGITOL™ 15-S-12 ($C_{15}$ alcohol 12 EO ethoxylate, HLB=14.5), TERGITOL™ 15-S-15 ($C_{15}$ alcohol 15 EO ethoxylate, HLB=15.4), and TERGITOL™ 15-S-20 ($C_{15}$ alcohol 20 EO ethoxylate, HLB=16.3). See, for example, Table 4, Examples 44-46.

As shown in Table 4, ethoxylated alcohols that lack a $C_{12}$-$C_{15}$ alcohol starter (Comparative Examples $C_{47}$, $C_{49}$, and $C_{50}$) or lack enough EO groups to provide an HLB of 13-16 (Comparative Example $C_{48}$) perform poorly as friction reducer boosters. Interestingly, commercial friction reducers formulated as polyacrylamide water-in-oil emulsions often include ethoxylated alcohols from $C_8$-$C_{11}$ alcohol starters or ethoxylated alcohols that have HLB values less than 13.

5. Alkylphenol Ethoxylates

Suitable nonionic surfactants include alkylphenol ethoxylates having a $C_8$-$C_{10}$ alkyl group and an average of 8 to 25 oxyethylene units, preferably 8 to 12 oxyethylene units. Suitable alkylphenol ethoxylates are readily made by reacting a phenol substituted with a $C_8$-$C_{10}$ alkyl group with a desired number of molar equivalents of ethylene oxide according to well-known methods. Suitable alkylphenol ethoxylates are also commercially available from Stepan Company under the MAKON® mark, or from other suppliers. Examples include nonylphenol ethoxylates such as MAKON® 8, MAKON® 10, MAKON® 12, and MAKON® 14, which have an average of 8, 10, 12, or 14 oxyethylene units, respectively, and octylphenol ethoxylates such as MAKON® OP-9, which has an average of 9 oxyethylene units. See, for example, Table 3, Examples 23-27.

When the degree of ethoxylation is too low or too high, the benefit of the alkylphenol ethoxylates for reducing friction can suffer. See Table 3, Comparative Examples C22 and C28.

6. EO-Capped Poly(Oxypropylene) Block Copolymers

Suitable EO-capped poly(oxypropylene) block copolymers have a calculated HLB value within the range of 13 to 16. Generally, these materials are made by polymerizing propylene oxide in the presence of water or a difunctional starter such as propylene glycol or dipropylene glycol in the presence of a catalyst, usually a basic catalyst, to produce a poly(oxypropylene) intermediate. The intermediate is then reacted with enough ethylene oxide to reach a desired HLB value within the range of 13 to 16.

Suitable EO-capped poly(oxypropylene) block copolymers having a calculated HLB value within the range of 13 to 16 are commercially available. Examples include Stepan's MAKON® P-105 (HLB=15) and BASF's PLURONIC® P-104 (HLB=13) and PLURONIC® L-64 (HLB=15). See also Table 4, Examples 51-53.

In some aspects, the nonionic surfactants are aralkylated phenol ethoxylates, $C_{12}$-$C_{22}$ amine ethoxylates, $C_{12}$-$C_{22}$ amidoamine ethoxylates, or $C_8$-$C_{16}$ alkyl-substituted phenol ethoxylates having and an average of 8 to 25 oxyethylene units, each group having calculated HLB values within the range of 11 to 17, preferably from 11 to 14.

"Calculated HLB value" as used herein generally refers to the HLB calculated from:

$$HLB = (20 \times M_h)/M$$

where $M_h$ is the average molar mass of the hydrophilic portion of the molecule, and M is the average molar mass of the entire molecule. HLB values for commercially available nonionic surfactants are often provided on the supplier's technical datasheet.

In some aspects, the weight ratio of nonionic surfactant to acrylamide polymer will be within the range of 0.001:1 to 1:1, preferably within the range of 0.01:1 to 0.1:1. Thus, the amount of nonionic surfactant will normally be less in comparison with the amount of acrylamide polymer used, typically 1 to 10 wt. % of the amount of acrylamide polymer.

In some aspects, the nonionic surfactant has a number-average molecular weight within the range of 500 to 1500 g/mol, or within the range of 600 to 1200 g/mol, as measured by gel-permeation chromatography.

The acrylamide polymer emulsion and the nonionic surfactant can be supplied in numerous forms. They can be part of the same composition, or they can be introduced into the hydraulic fracturing process independently. When introduced together, they may be supplied as a water-in-oil emulsion, suspension, or other form. The most desirable form of friction reducer and mode of introduction for a given fracturing operation is left to the skilled person's discretion.

Inverted Aqueous Mixtures

In other aspects, the invention includes inverted aqueous mixtures. These mixtures comprise an aqueous brine and the inventive friction reducer compositions described above. The aqueous brines have a total dissolved solids content of at least 10,000 ppm, at least 20,000 ppm, or at least 30,000 ppm. In some aspects, the aqueous brines have a total dissolved solids content within the range of 10,000 to 300,000 ppm, from 20,000 to 200,000 ppm, or from 30,000 to 100,000 ppm.

The inverted aqueous mixtures will contain from 0.001 to 1 wt. %, based on the amount of inverted aqueous mixture, of the inventive friction reducer composition. Preferred compositions will contain from 0.01 to 1 wt. % or from 0.1 to 0.8 wt. % of the friction reducer composition based on the amount of inverted aqueous mixture.

Hydraulic Fracturing Processes

The invention includes hydraulic fracturing processes for recovering oil using acrylamide polymer-based friction reducers, including slickwater fracturing processes. Slickwater fracturing is generally known and is described in U.S. Publ. No. 2017/0096597 and U.S. Pat. Nos. 6,776,235; 7,579,302; 7,621,335; 9,365,764; and 9,670,398, the teachings of which are incorporated by reference.

Compositions used in a hydraulic fracturing process usually include water, a partially hydrolyzed polyacrylamide friction reducer, and other additives, which may include, among other things, scale inhibitors, corrosion inhibitors, biocides, and surfactants. The water can originate from various sources from fresh water to sources that have high TDS content, such as collection ponds of produced water. The base water can be fresh water or any variety of brine, particularly produced water from a slickwater fracturing process. In some aspects, the monovalent cation content of the base water exceeds 10,000 ppm, 20,000 ppm, 50,000 ppm, 80,000 ppm, 100,000 ppm, or 300,000 ppm of total dissolved solids. In some aspects, the divalent cation content of the base water exceeds 500 ppm, 2,000 ppm, 10,000 ppm, or 20,000 ppm of total dissolved solids.

In some aspects, the friction reducer is combined with the base water at a concentration of 0.01 to 50 gallons per thousand gallons ("gpt") of base water, 0.01 to 10 gallons per thousand gallons of base water, or 0.1 to 5 gallons per thousand gallons of base water. Typical levels of friction reducer are in the range of 1000 ppm to 2000 ppm. In processes of the invention, the nonionic surfactant is included in the friction reducer or is added independently, typically at 0.01 to 0.2 gallons per thousand gallons of water, or 0.02 to 0.08 gallons per thousand gallons, with the most desirable amount depending on the salt content of the base water.

In one inventive hydraulic fracturing process for recovering oil using an acrylamide polymer emulsion as a friction reducer, the improvement comprises using as a friction reducer a composition comprising the acrylamide polymer emulsion and an effective amount of a nonionic surfactant. Suitable acrylamide polymers and nonionic surfactants have already been described. As used in this application, "effective amount" means an amount of nonionic surfactant effective to boost the friction-reducing capability of an acrylamide polymer when that polymer is used as a friction reducer in a hydraulic fracturing process.

In another inventive hydraulic fracturing process for recovering oil using an acrylamide polymer emulsion as a friction reducer, the improvement comprises including in the process an effective amount of a nonionic surfactant selected from (a) aralkylated phenol ethoxylates; (b) $C_{12}$-$C_{22}$ amine ethoxylates or $C_{12}$-$C_{22}$ amidoamine ethoxylates; (c) alkoxylates of linear or branched $C_8$-$C_{18}$ alcohols, the alkoxylates having 10 to 90 mole % of oxyethylene units and 10 to 90 mole % of oxypropylene units, wherein the mole % values are based on the combined amounts of oxyethylene and oxypropylene units; or (d) ethoxylated $C_{12}$-$C_{15}$ alcohols having a calculated HLB value within the range of 13 to 16; (e) alkylphenol ethoxylates having a $C_5$-$C_{16}$ alkyl group and an average of 8 to 25 oxyethylene units; and (f) ethylene oxide-capped poly(oxypropylene) block copolymers having a calculated HLB value within the range of 13 to 16.

We surprisingly found that inclusion of certain nonionic surfactants provides advantages for friction reduction. In particular, the performance of low-cost polyacrylamide emulsion friction reducers can be boosted by including a small proportion of these readily available nonionic surfactants. Moreover, the inventive compositions are effective in high-salinity environments, thereby avoiding the need for expensive salt-tolerant friction reducers and enabling greater utilization of produced water.

Thus, the nonionic surfactant could be part of the friction reducing composition as described earlier, or in this case, it could be introduced independently as a separate stream from the acrylamide polymer emulsion friction reducer in the hydraulic fracturing process. In some aspects, it may be desirable to introduce the nonionic surfactant concurrently, or substantially concurrently, with the addition of the acrylamide polymer emulsion. In other aspects, the nonionic surfactant is introduced into the base water in advance, and the acrylamide polymer emulsion is added to the base water/nonionic surfactant mixture.

The inventive compositions and processes will be of considerable interest to oilfield service companies because of the ability to reduce their cost in providing fracturing service. A small proportion of the nonionic surfactant (20 to 80 mL/m$^3$) enables the use of less-expensive friction reducers such as partially hydrolyzed polyacrylamide emulsions even in high-salinity environments while providing performance of the more-expensive salt-tolerant polymers. This also allows the service provider to use less-diluted produced water, which is better for the environment.

Although hydraulic fracturing processes are of primary interest, the inventive compositions may have utility in other areas, particularly where acrylamide polymer emulsions are used to reduce turbulence in a conduit, and particularly where the aqueous stream has a high TDS content, including streams rich in multivalent cations. Other oilfield processes that may benefit from the inventive compositions include drilling fluids, completion fluids, and other uses in midstream or downstream production.

The following examples merely illustrate the invention; the skilled person will recognize many variations that are within the spirit of the invention and scope of the claims.

Flow-Loop Experiments

Friction reduction is evaluated in flow-loop experiments using a Chandler Engineering model 6500 friction flow-loop system. The unit measures the change in differential pressure as the friction reducer is added into the system. It includes two 20' segments of ½" and ⅔" outer diameter stainless-steel tubing, two 10' segments to measure differential pressure, and a progressive cavity pump for consistent flow in the 1-15 gallons per minute range.

Various brines are prepared to simulate downhole salinity environments. These include synthetic seawater (Coralife™ mix marine salt), potassium chloride brine (80,000 ppm K), and calcium chloride brine (2,000 ppm Ca). Synthetic seawater contains about 400 ppm Ca and about 1200 ppm of Mg. For each test, 3-5 gallons of brine are prepared.

Brine is added directly into the fluid tub of the flow-loop system. Brine flows at a slow rate (2 gallons per minute, "gpm") until the flow loop is filled. The test begins at a flow rate of 8 gpm. Surfactant is either added directly into a water-in-oil emulsion of partially hydrolyzed polyacrylamide in hydrocarbon or is added into the tub immediately after starting the test. The flow loop runs for 2 min. before the polymer emulsion is added (at a concentration of 0.25 gallons per thousand gallons (gpt) via an injection pump directly into the loop. The test runs for 8-25 min, and the percent friction reduction is monitored and recorded as a function of time. A successful result in this experiment involves rapid inversion of the emulsion, a rapid reduction in friction exceeding 65% within the first 5 min. of the test, and maintenance of friction reduction over the 25-min. test period.

Commercially available nonionic surfactants are evaluated as potential friction reduction boosters for use in combination with a partially hydrolyzed polyacrylamide (HPAM) emulsion friction reducer. The base liquid used is synthetic seawater. As shown in Table 1, several amine ethoxylates and tristyrylphenol ethoxylates, when combined with HPAM, outperform HPAM alone by a wide margin. In particular, these nonionic surfactants had calculated HLB values within the range of 11 to 17. Compositions having HLB values outside this range did not deliver improved performance compared with the HPAM friction reducer alone. Thus, for example, a tallowamine (5 EO) ethoxylate with an HLB value of 9 and a tristyrylphenol (60 EO) ethoxylate with an HLB value of about 18 are considered comparative examples under these test conditions.

FIG. 1 shows just the results from using tristyrylphenol ethoxylates to boost the performance of a partially hydrolyzed polyacrylamide friction reducer in a seawater base compared with performance with no booster added. As shown in the figure, the high HLB composition, tristyrylphenol (60 EO) ethoxylate, does not perform as well as the baseline HPAM friction reducer. In contrast, tristyrylphenol (16 EO) ethoxylate and tristyrylphenol (20 EO) ethoxylate, which have calculated HLB values of about 14, outperform the baseline friction reducer by a wide margin.

Figure 2:
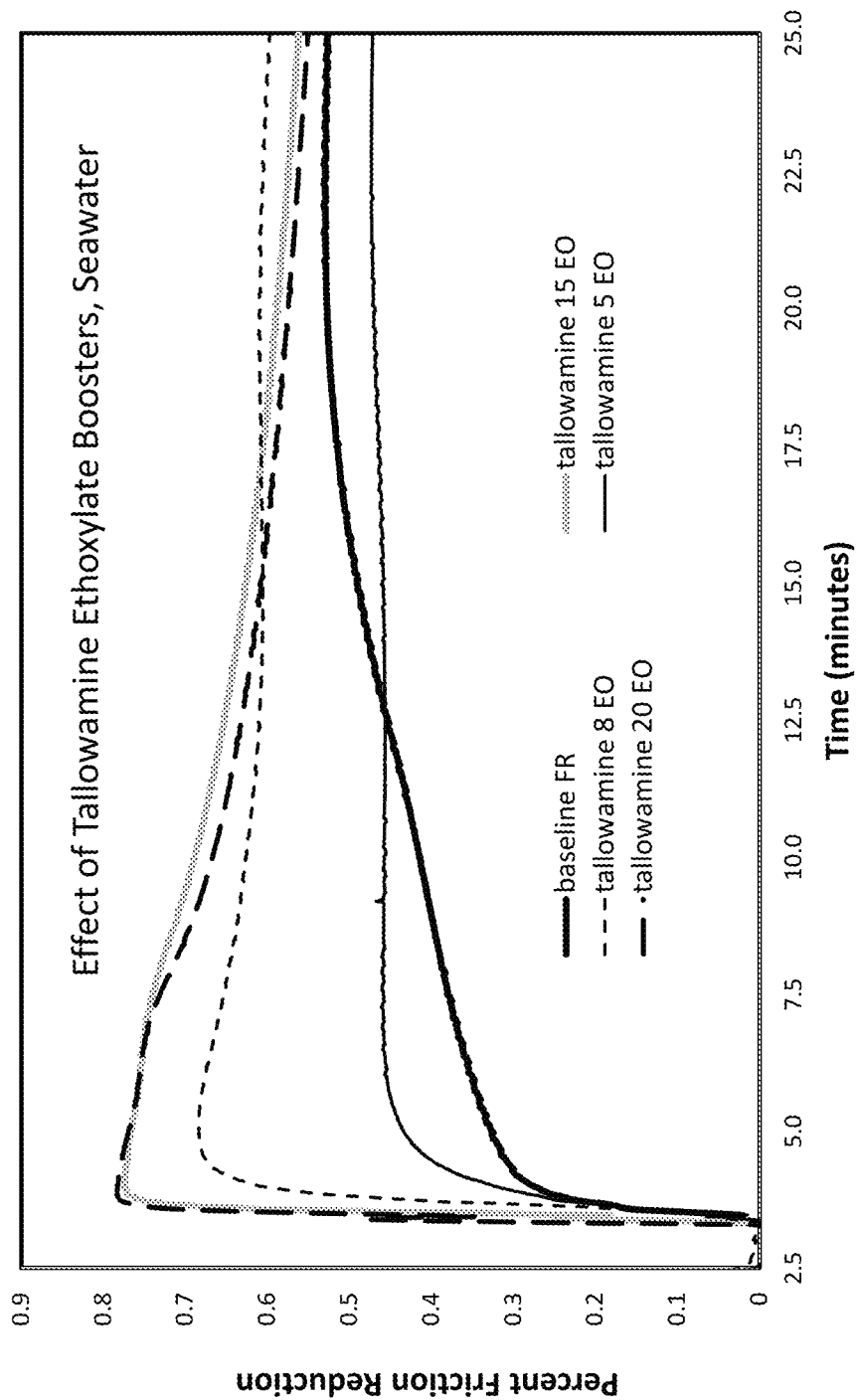
FIG. 2 shows the effect of using a series of $C_{16}$-$C_{22}$ amine ethoxylate compositions to boost the performance of a partially hydrolyzed polyacrylamide friction reducer in a seawater base compared with baseline performance with no booster added.

FIG. 2 focuses on the results when tallowamine ethoxylates are used to boost the performance of the HPAM friction reducer in a seawater base compared with performance with no booster added. As shown in the figure, the low HLB composition, tallowamine (5 EO) ethoxylate, does not perform as well as the baseline HPAM friction reducer. In contrast, tallowamine (8 EO) ethoxylate, tallowamine (15 EO) ethoxylate, and tallowamine (20 EO) ethoxylate, which have calculated HLB values of 11, 14, and 15.5, respectively, outperform the baseline friction reducer by a wide margin.

Figure 3:
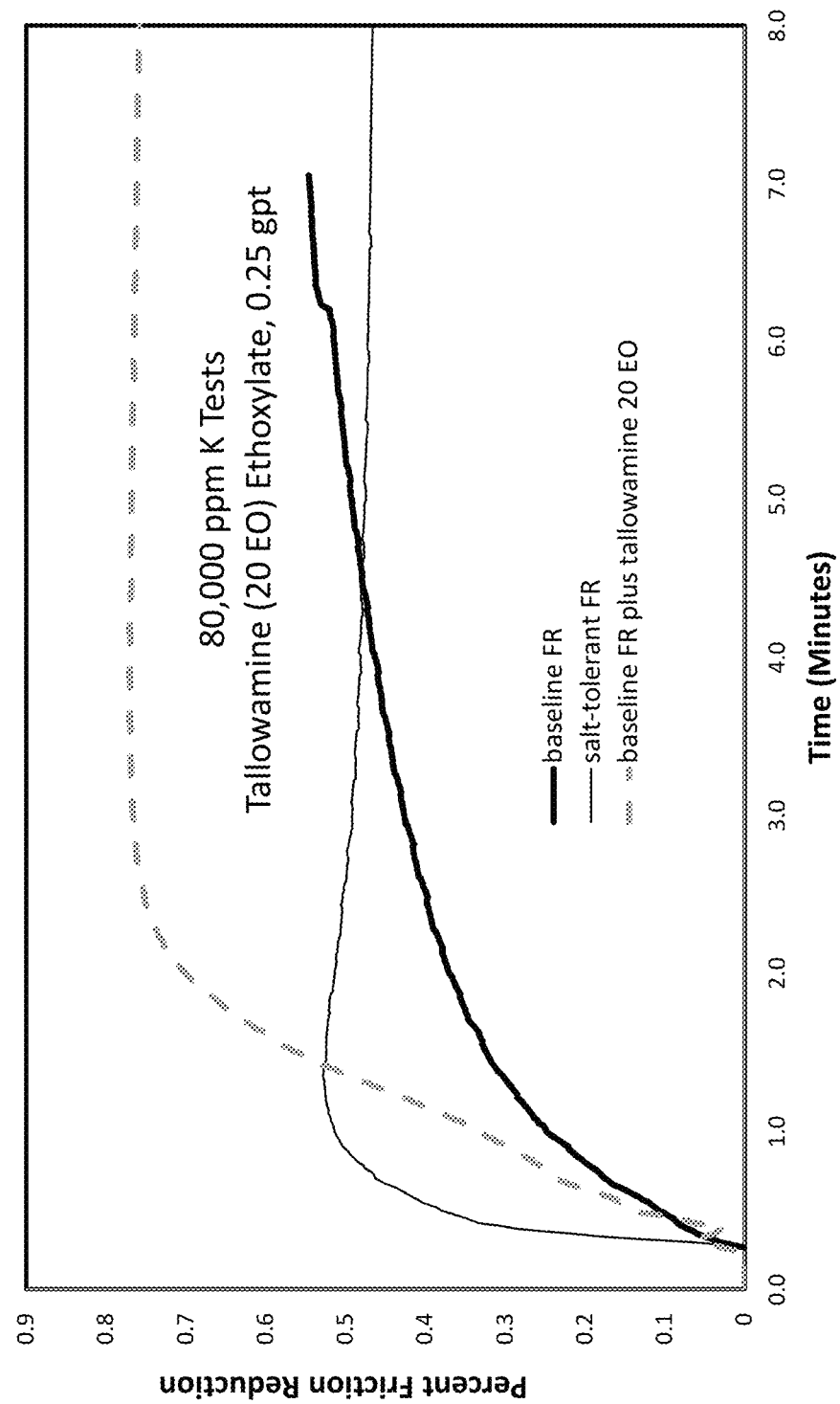
FIG. 3 shows that combining a tallowamine (20 EO) ethoxylate with a partially hydrolyzed polyacrylamide friction reducer in 80,000 ppm K water improves on baseline performance and outperforms an alternative salt-tolerant friction reducer.

FIG. 3 demonstrates that the combination of tallowamine (20 EO) ethoxylate and HPAM can outperform HPAM alone in a high-salinity environment (80,000 ppm of potassium). Surprisingly, the inventive combination also outperforms a salt-tolerant anionic friction reducer by a wide margin in this test. The salt-tolerant friction reducer provides a significant reduction in friction within the first minute the fluid circulates in the closed loop. However, the degree of friction reduction levels off at about 50%. In contrast, when HPAM is used in combination with a tallowamine (20 EO) ethoxylate, friction reduction reaches 70% within two minutes, and a greater overall degree of friction reduction (77%) is achieved.

Figure 4:
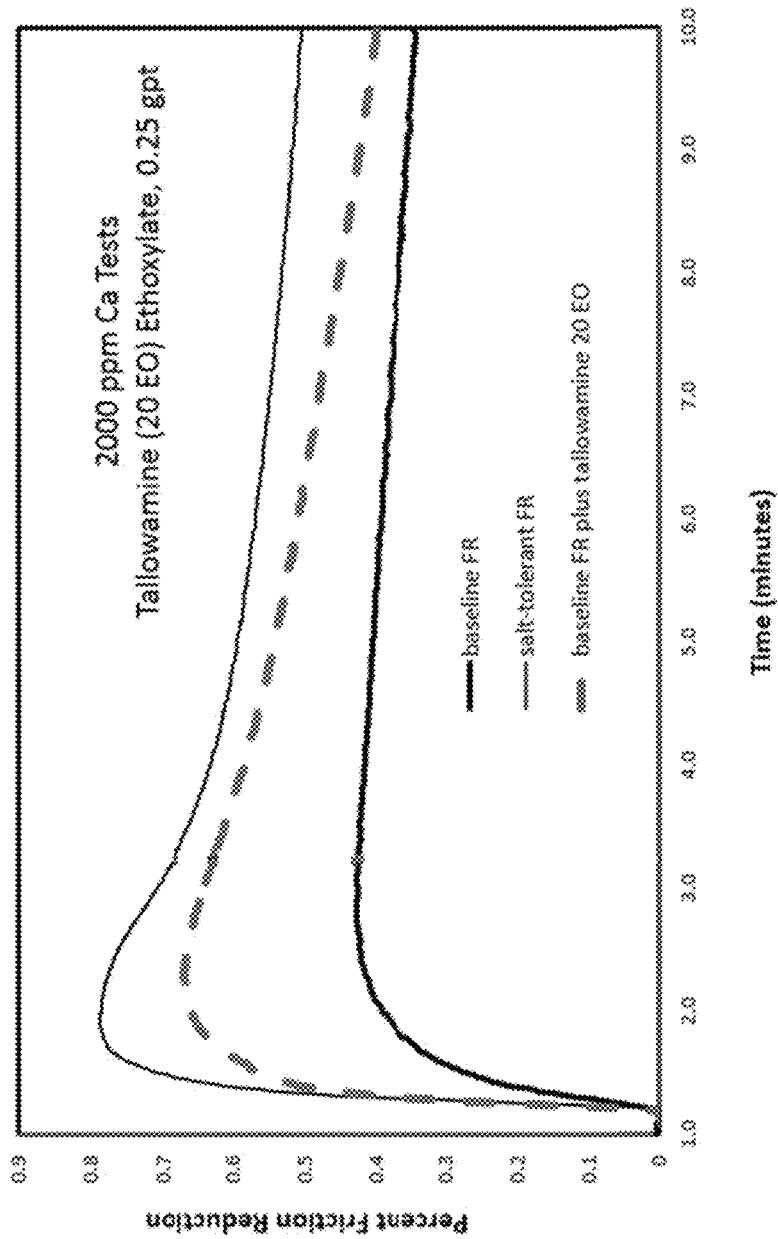
FIG. 4 shows that combining a tallowamine (20 EO) ethoxylate with a partially hydrolyzed polyacrylamide friction reducer in 2,000 ppm Ca water improves on baseline performance and performs almost as well as an alternative salt-tolerant friction reducer.

FIG. 4 shows that combining tallowamine (20 EO) ethoxylate with HPAM friction reducer in 2,000 ppm Ca water performs better than HPAM alone and almost as well as an alternative salt-tolerant friction reducer.

Figure 5:
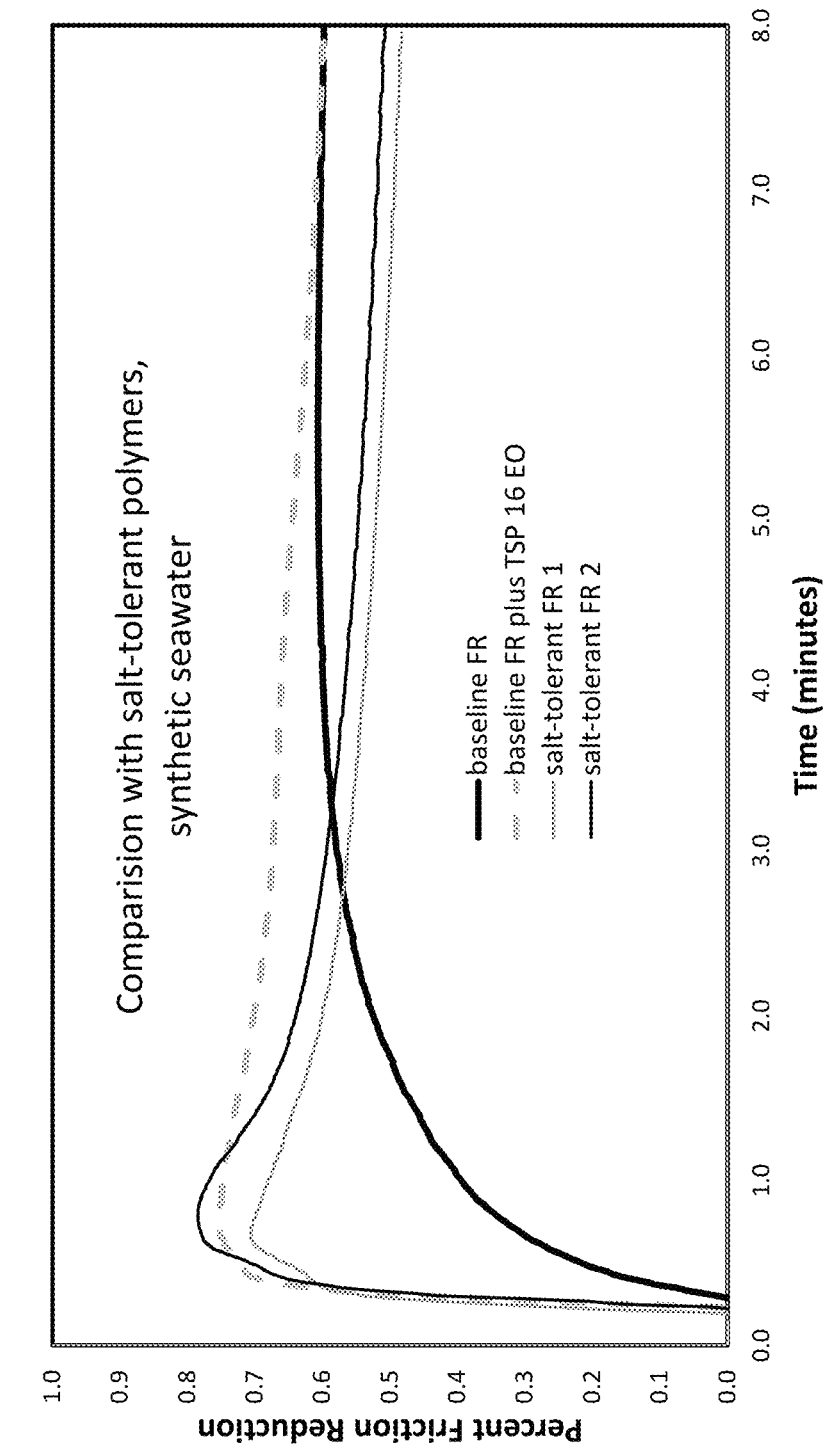
FIG. 5 shows that combining a tristyrylphenol (16 EO) ethoxylate with a partially hydrolyzed polyacrylamide friction reducer in synthetic seawater improves on baseline performance and performs as well as or better than two alternative salt-tolerant friction reducers.

FIG. 5 shows that combining tristyrylphenol (16 EO) ethoxylate with HPAM friction reducer in synthetic seawater performs as well as or better than two alternative salt-tolerant friction reducers.

Overall, these results demonstrate that certain nonionic surfactants, i.e., amine ethoxylates and aralkylated phenol ethoxylates, each having calculated HLB values within the range of 11 to 17, can improve the performance of conventional acrylamide-based friction reducers. The improvements are particularly valuable in the presence of high concentrations of monovalent and divalent cations because conventional friction reducers often lose their efficacy in high-salinity environments. The ability to tolerate higher salinities allows use of a greater proportion of produced water, thereby reducing fresh water demand in a hydraulic fracturing process.

As noted above, benefits of the inventive compositions are most evident under high salinity conditions. As shown in Table 2, Comparative Examples C9-C11, the polyacrylamide emulsion friction reducer performs well in tap water at 0.75 gallons per thousand gallons concentration without any added nonionic surfactant, but increasing salinity hampers performance. Introduction of a tristyrylphenol ethoxylate (MAKON® TSP-16) at 80-100 ppm maintains a high performance level even at higher salinities.

Additional Flow-Loop Experiments

In another series of experiments, various nonionic surfactant classes are tested for their ability to boost friction reduction when evaluated in synthetic seawater (3.5 wt. % marine salt) or 2× seawater (7.0 wt. % marine salt) with a commercial HPAM friction reducer (FLOPAM™ EMF-533 anionic polyacrylamide emulsion, product of SNF Floerger) at an emulsion concentration of 0.25 gpt.

The procedure used is essentially the one described earlier. A successful result in this experiment is evaluated as follows. First, the friction reducer should be able to perform well (friction reduction of 70% or more) on its own, i.e., in the absence of the added nonionic surfactant, in salt water, at a concentration of 0.25 gallons per thousand gallons. Second, the test is performed under conditions that stress performance of the friction reducer such that friction reduction degrades to less than 65% within the first 5 minutes of the flow-loop test. This condition is satisfied in the present case by using synthetic seawater and 0.25 parts per thousand as the concentration of the friction reducer. When 2× saltwater is used, the FR performance is further stressed. Third, combination of friction reducer and nonionic surfactant should provide at least 70% friction reduction at a nonionic surfactant concentration at or below 80 ppm.

In each case, the tested surfactant/friction reducer combination achieves at least a 70% reduction in friction in the flow-loop test compared with the use of the polyacrylamide emulsion alone at 20-80 ppm of surfactant/friction reducer combination. The results (Tables 3 and 4) demonstrate that readily available nonionic surfactant classes, when combined at low concentrations with a low-cost friction reducer such as HPAM, can significantly reduce friction thereby enabling more economical use of these important oilfield additives.

Generally, the tallowamine ethoxylates and tristyrylphenol ethoxylates provide excellent friction reduction, even at low concentration (20 ppm). TOXIMUL® TA-5 (Example 19) represents borderline performance at the maximum concentration of 80 ppm. For the nonylphenol ethoxylates, performance is excellent except at low HLB (Comparative Example C22) or high HLB (Comparative Example C28). The results with the amidoamine ethoxylates using 2× seawater (Table 3) show that good performance can be achieved with this class of nonionic surfactants even under more challenging conditions. The C-65 AEEA amide 15EO sample (Example 34) fails to reach 70% friction reduction but would likely to do so if seawater is used instead of 2X seawater.

As shown in Table 4, PO-capped alcohol ethoxylates generally perform well (Examples 35-43). For the alcohol ethoxylates, good performance appears to require a $C_{12}$-$C_{15}$ alcohol and an HLB within the range of 13 to 16 for best results. This is surprising given that some polyacrylamide emulsions are formulated with less-hydrophilic alcohol ethoxylates like MAKON® TD-6.

The preceding examples are meant only as illustrations; the following claims define the scope of the invention.

TABLE 1

Enhancement of Friction Reducer Performance with Tallowamine Ethoxylates and Tristyrylphenol Ethoxylates

| Ex. | Booster | HLB | moles EO | $M_n$ (g/mol) | Surfactant concentration, ppm | % friction reduction[1] | Aids performance versus control? |
|---|---|---|---|---|---|---|---|
| 1 | TOXIMUL ® TA-15 | 14 | 15 | 920 | 20 | 77 | yes |
| 2 | TOXIMUL ® TA-20 | 15.5 | 20 | 1120 | 20 | 77 | yes |
| 3 | MAKON ® TSP-20 | 14 | 20 | 1190 | 20 | 75 | yes |
| 4 | MAKON ® TSP-16 | 14 | 16 | 1010 | 20 | 71 | yes |
| 5 | TOXIMUL ® TA-8 | 11 | 8 | 610 | 20 | 68 | yes |
| C6 | MAKON ® TSP-60 | 18 | 60 | 2950 | 20 | <50 | no |
| C7 | TOXIMUL ® TA-5 | 9 | 5 | 468 | 20 | <50 | no |
| C8 | none (control) | | | | | 53* | Control |

[1]Tested in seawater with partially hydrolyzed polyacrylamide friction reducer (FR); % friction reduction achieved within 5 min. of addition of the FR + booster compared with FR alone as the control.
*Maximum of 53% at 10 min. TOXIMUL ® and MAKON ® products are available from Stepan Company.

TABLE 2

Enhancement of Friction Reducer Performance with Tristyrylphenol Ethoxylate (MAKON TSP-16): Effect of Base Water

| Ex. | Booster | base water | TDS, ppm | FR concentration, gpt | Surfactant concentration, ppm | Maximum friction reduction, % |
|---|---|---|---|---|---|---|
| C9 | none (control) | tap water | 200 | 0.75 | 0 | 77.2 |
| C10 | none (control) | seawater | 35,000 | 0.75 | 0 | 70.5 |
| C11 | none (control) | 2X seawater | 70,000 | 0.75 | 0 | 62.7 |
| 12 | MAKON ® TSP-16 | tap water | 200 | 0.75 | 100 | 77.3 |
| 13 | MAKON ® TSP-16 | seawater | 35,000 | 0.75 | 80 | 78.5 |
| 14 | MAKON ® TSP-16 | 2X seawater | 70,000 | 0.75 | 80 | 77.5 |

[1] Friction reducer (FR) is FLOPAM ™ EMF-533, partially hydrolyzed polyacrylamide. TDS = total dissolved solids. MAKON ® TSP-16 is tristyrylphenol 16 EO ethoxylate, product of Stepan Company.

TABLE 3

Enhancement of Friction Reducer Performance with Nonionic Surfactants

| Ex. | Booster | Description | Surfactant concentration, ppm | Maximum friction reduction, % |
|---|---|---|---|---|
| C15 | none (control) | | | 56.9 |
| 16 | TOXIMUL ® TA-20 | tallowamine ethoxylate | 20 | 78.3 |
| 17 | TOXIMUL ® TA-15 | tallowamine ethoxylate | 20 | 77.9 |
| 18 | TOXIMUL ® TA-8 | tallowamine ethoxylate | 20 | 68.4 |
| 19 | TOXIMUL ® TA-5 | tallowamine ethoxylate | 80 | 69.5 |
| 20 | MAKON ® TSP-16 | tristyrylphenol ethoxylate | 20 | 78.3 |
| 21 | MAKON ® TSP-20 | tristyrylphenol ethoxylate | 20 | 74.0 |
| C22 | MAKON ® 6 | nonylphenol ethoxylate | 80 | 66.4 |
| 23 | MAKON ® 8 | nonylphenol ethoxylate | 80 | 76.3 |
| 24 | MAKON ® 10 | nonylphenol ethoxylate | 80 | 77.3 |
| 25 | MAKON ® 10 | nonylphenol ethoxylate | 50 | 76.4 |
| 26 | MAKON ® 12 | nonylphenol ethoxylate | 80 | 77.2 |
| 27 | MAKON ® OP-9 | octylphenol ethoxylate | 80 | 76.6 |
| C28 | MAKON ® 30 | nonylphenol ethoxylate | 80 | 65.9 |
| 29 | C-65 AEEA amide 15EO | amidoamine ethoxylate | 80 | 70.2 |
| C30* | none (control) | | | 54.1 |
| 31* | C-65 AEEA amide 2EO | amidoamine ethoxylate | 80 | 71.7 |
| 32* | C-65 AEEA amide 6EO | amidoamine ethoxylate | 80 | 72.6 |
| 33* | C-65 AEEA amide 10EO | amidoamine ethoxylate | 80 | 70.6 |
| 34* | C-65 AEEA amide 15EO | amidoamine ethoxylate | 80 | 60.6 |

[1] Tested in seawater with FLOPAM ™ EMF-533 (anionic polyacrylamide emulsion, product of SNF Floerger) except where identified by * as a 2X seawater example. The amidoamine ethoxylates are made by reacting STEPAN ® C-65 methyl ester mixture with 2-aminoethylethanolamine (AEEA) to make an amidoamine, followed by ethoxylation with the molar amounts of EO indicated. TOXIMUL ®, MAKON ®, and STEPAN ® products are available from Stepan Company.

TABLE 4

Enhancement of Friction Reducer Performance with Nonionic Surfactants

| Ex. | Booster | Description | Surfactant concentration, ppm | Maximum friction reduction, % |
|---|---|---|---|---|
| C15 | none (control) | | 0 | 56.9 |
| 35 | TD-10EO-4PO | $C_{13}$ alcohol block EO-PO alkoxylate | 80 | 78.0 |
| 36 | TD-10EO-5PO random | $C_{13}$ alcohol random EO-PO alkoxylate | 80 | 77.4 |
| 37 | TD 6.8EO-3.4PO random | $C_{13}$ alcohol random EO-PO alkoxylate | 80 | 76.6 |
| 38 | TD 13.2EO-3.8PO | $C_{13}$ alcohol block EO-PO alkoxylate | 80 | 74.4 |
| 39 | TD 7EO-8PO | $C_{13}$ alcohol block EO-PO alkoxylate | 80 | 74.3 |
| 40 | TD 5EO-5PO | $C_{13}$ alcohol block EO-PO alkoxylate | 80 | 73.6 |
| 41 | TD 4EO-7PO | $C_{13}$ alcohol block EO-PO alkoxylate | 80 | 72.9 |
| 42 | N23-12.4EO-11 PO | $C_{12}$-$C_{13}$ alcohol block EO-PO alkoxylate | 80 | 77.6 |
| 43 | N23-4EO-4PO | $C_{12}$-$C_{13}$ alcohol block EO-PO alkoxylate | 80 | 74.9 |
| 44 | TERGITOL ™ 15-S-9 | $C_{12}$-$C_{15}$ sec-alcohol ethoxylate, HLB = 13.3 | 80 | 75.4 |
| 45 | MAKON ® TD-18 | $C_{13}$ alcohol ethoxylate, HLB = 16 | 80 | 71.2 |
| 46 | BIO-SOFT ® N25-9 | $C_{12}$-$C_{15}$ alcohol ethoxylate, HLB = 13.3 | 80 | 70.4 |
| C47 | MAKON ® DA-9 | $C_{10}$ alcohol ethoxylate, HLB = 14 | 80 | 28.7 |
| C48 | MAKON ® TD-6 | $C_{13}$ alcohol ethoxylate, HLB-11 | 80 | 53.3 |
| C49 | ECOSURF ™ EH-9 | $C_8$ branched alcohol ethoxylate, HLB = 12.5 | 80 | 27.8 |
| C50 | LUTENSOL ® XP-80 | $C_{10}$ Guerbet alcohol ethoxylate, HLB = 13 | 80 | 44.5 |
| 51 | MAKON ® P-105 | EO-capped polyPO block copolymer, HLB = 15 | 80 | 72.9 |
| 52 | PLURONIC ® P-104 | EO-capped polyPO block copolymer, HLB = 13 | 80 | 72.0 |
| 53 | PLURONIC ® L-64 | EO-capped polyPO block copolymer, HLB = 15 | 80 | 70.3 |

[1] Tested in seawater with FLOPAM ™ EMF-533 (anionic polyacrylamide emulsion, product of SNF Floerger). TD alkoxylates are made by reacting a $C_{13}$ alcohol with the molar equivalents of EO and PO indicated. The N23 alkoxylates are made similarly starting from a $C_{12}$-$C_{13}$ alcohol mixture. The amidoamine ethoxylates are made by reacting STEPAN ® C-65 methyl ester mixture with 2-aminoethylethanolamine (AEEA) to make an amidoamine, followed by ethoxylation with the molar amounts of EO indicated. BIO-SOFT ® and MAKON ® products are available from Stepan Company. TERGITOL ™ and ECOSURF ™ ethoxylates are products of Dow Chemical. LUTENSOL ® ethoxylates ad PLURONIC ® copolymers are products of BASF.

We claim:

1. A composition suitable for use as a friction reducer for hydraulic fracturing, comprising:
   (a) an acrylamide polymer emulsion; and
   (b) a nonionic surfactant selected from the group consisting of:
      (i) tristyrylphenol ethoxylates having an average of 16 to 40 EO units;
      (ii) $C_{12}$-$C_{22}$ amine ethoxylates or $C_{12}$-$C_{22}$ amidoamine ethoxylates;
      (iii) alkoxylates of linear or branched $C_8$-$C_{18}$ alcohols, the alkoxylates having 10 to 90 mole % of oxyethylene units and 10 to 90 mole % of oxypropylene units, wherein the mole % values are based on the combined amounts of oxyethylene and oxypropylene units;
      (v) alkylphenol ethoxylates having a $C_8$-$C_{16}$ alkyl group and an average of 8 to 25 oxyethylene units; and
      (vi) ethylene oxide-capped poly(oxypropylene) block copolymers having a calculated HLB value within the range of 13 to 16.

2. The composition of claim 1 wherein the acrylamide polymer is a partially hydrolyzed polyacrylamide.

3. The composition of claim 1 wherein the amine ethoxylate is a tallowamine ethoxylate having an average of 8 to 20 EO units.

4. The composition of claim 1 wherein the tristyrylphenol ethoxylate, $C_{12}$-$C_{22}$ amine ethoxylate, $C_{12}$-$C_{22}$ amidoamine ethoxylate, or alkylphenol ethoxylate has an HLB within the range of 11 to 17.

5. The composition of claim 1 wherein the alkoxylates of linear or branched $C_8$-$C_{18}$ alcohols have 20 to 80 mole % of oxyethylene units and 20 to 80 mole % of oxypropylene units.

6. The composition of claim 1 wherein the alkoxylates of linear or branched $C_8$-$C_{18}$ alcohols have an internal EO block and an external PO block.

7. The composition of claim 1 wherein the alkoxylates of linear or branched $C_8$-$C_{18}$ alcohols are alkoxylates of linear or branched $C_{12}$-$C_{14}$ alcohols.

8. The composition of claim 1 wherein the alkylphenol ethoxylate has an average of 8 to 12 oxyethylene units.

9. The composition of claim 1 wherein the weight ratio of nonionic surfactant to acrylamide polymer is within the range of 0.001:1 to 1:1.

10. A composition suitable for use as a friction reducer for hydraulic fracturing, comprising:
    (a) an acrylamide polymer emulsion; and
    (b) a nonionic surfactant having a calculated HLB value within the range of 11 to 17 and selected from the group consisting of tristyrylphenol ethoxylates having an average of 16 to 40 EO units, $C_{16}$-$C_{22}$ amine ethoxylates, $C_{16}$-$C_{22}$ amidoamine ethoxylates, and alkylphenol ethoxylates having a $C_8$-$C_{16}$ alkyl group and an average of 6 to 40 oxyethylene units.

11. The composition of claim 10 wherein the nonionic surfactant has a calculated HLB value within the range of 11 to 14.

12. An inverted aqueous mixture comprising:
    (a) an aqueous brine having a total dissolved solids content of at least 10,000 ppm; and
    (b) from 0.001 to 1 wt. %, based on the amount of inverted aqueous mixture, of the composition of claim 1.

13. The inverted aqueous mixture of claim 12 wherein the aqueous brine has a total dissolved solids content of at least 20,000 ppm.

14. In a hydraulic fracturing process for recovering oil using an acrylamide polymer emulsion, the improvement which comprises using as a friction reducer the composition of claim 1.

15. The process of claim 14 wherein the acrylamide polymer emulsion is added to base water at a concentration of 0.01 to 10 gallons per thousand gallons of base water.

16. The process of claim 15 wherein the monovalent cation content of the base water exceeds 20,000 ppm.

17. In a hydraulic fracturing process for recovering oil using an acrylamide polymer emulsion as a friction reducer, the improvement which comprises including in the process an effective amount of a nonionic surfactant selected from the group consisting of:
   (a) tristyrylphenol ethoxylates having an average of 16 to 40 EO units;
   (b) $C_{12}$-$C_{22}$ amine ethoxylates or $C_{12}$-$C_{22}$ amidoamine ethoxylates;
   (c) alkoxylates of linear or branched $C_8$-$C_{18}$ alcohols, the alkoxylates having 10 to 90 mole % of oxyethylene units and 10 to 90 mole % of oxypropylene units, wherein the mole % values are based on the combined amounts of oxyethylene and oxypropylene units;
   (d) ethoxylated $C_{12}$-$C_{15}$ alcohols having a calculated HLB value within the range of 13-16;
   (e) alkylphenol ethoxylates having a $C_8$-$C_{16}$ alkyl group and an average of 8 to 25 oxyethylene units; and
   (f) ethylene oxide-capped poly(oxypropylene) block copolymers having a calculated HLB value within the range of 13-16.

18. The process of claim 17 wherein the nonionic surfactant is combined with base water prior to introduction of the acrylamide polymer emulsion.

19. A composition suitable for use as a friction reducer for hydraulic fracturing, comprising:
   (a) an acrylamide polymer emulsion; and
   (b) a nonionic surfactant selected from the group consisting of:
      (i) tristyrylphenol ethoxylates having an average of 16 to 40 EO units;
      (iii) alkoxylates of linear or branched $C_8$-$C_{18}$ alcohols, the alkoxylates having 10 to 90 mole % of oxyethylene units and 10 to 90 mole % of oxypropylene units, wherein the mole % values are based on the combined amounts of oxyethylene and oxypropylene units;
      (v) alkylphenol ethoxylates having a $C_8$-$C_{16}$ alkyl group and an average of 8 to 25 oxyethylene units; and
      (vi) ethylene oxide-capped poly(oxypropylene) block copolymers having a calculated HLB value within the range of 13 to 16.

20. The composition of claim 1 wherein the nonionic surfactant comprises tristyrylphenol ethoxylates having an average of 16 to 40 EO units.

21. The composition of claim 1 wherein the nonionic surfactant comprises $C_{12}$-$C_{22}$ amine ethoxylates or $C_{12}$-$C_{22}$ amidoamine ethoxylates.

22. The composition of claim 1 wherein the nonionic surfactant comprises alkoxylates of linear or branched $C_8$-$C_{18}$ alcohols, the alkoxylates having 10 to 90 mole % of oxyethylene units and 10 to 90 mole % of oxypropylene units, wherein the mole % values are based on the combined amounts of oxyethylene and oxypropylene units.

23. The composition of claim 1 wherein the nonionic surfactant comprises alkylphenol ethoxylates having a $C_8$-$C_{16}$ alkyl group and an average of 8 to 25 oxyethylene units.

24. The composition of claim 1 wherein the nonionic surfactant comprises ethylene oxide-capped poly(oxypropylene) block copolymers having a calculated HLB value within the range of 13 to 16.

* * * * *